UNITED STATES PATENT OFFICE.

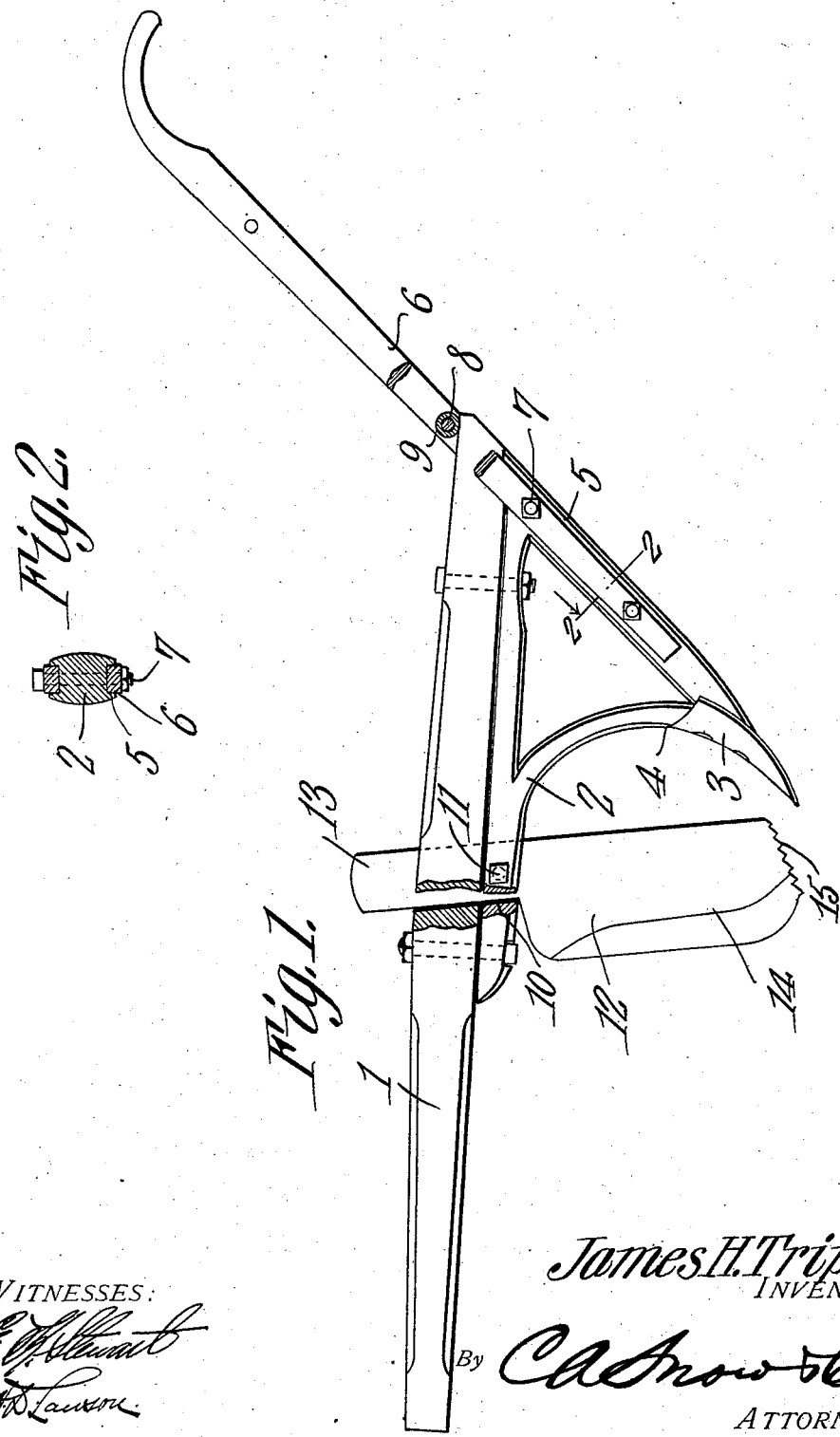

JAMES H. TRIPP, OF VANCEBORO, NORTH CAROLINA, ASSIGNOR TO JOSEPH B. HARVEY, OF VANCEBORO, NORTH CAROLINA.

VIRGIN-GROUND PLOW.

No. 857,319.  Specification of Letters Patent.  Patented June 18, 1907.

Application filed April 16, 1907. Serial No. 368,516.

*To all whom it may concern:*

Be it known that I, JAMES H. TRIPP, a citizen of the United States, residing at Vanceboro, in the county of Craven and State of North Carolina, have invented a new and useful Virgin-Ground Plow, of which the following is a specification.

This invention has relation to plows especially adapted to be used for breaking virgin soil and it consists in the novel construction and arrangement of its parts as hereinafter shown and described.

The object of the invention is to provide a plow of such substantial construction as to be able to withstand the strain incident to breaking soil of the character indicated and which is provided with a colter of peculiar configuration which is braced upon the frame of the plow and which is adapted to sever such roots as it may come in contact with or jump the same and thereby prevent the plow from becoming caught. The colter is provided with a series of teeth or serrations which are adapted to operate upon the roots in a manner similar to that of a saw.

In the accompanying drawings:—Figure 1 is a side elevation of the plow with parts in section, and Fig. 2 is a transverse sectional view of the lower branch of the standard of the plow cut on the line 2—2 of Fig. 1.

The plow consists of the beam 1 which is bolted to the top of a standard 2. Said standard is substantially triangular and is preferably formed from integral metal. That side of the standard which lies under the beam 1 is longer than the lower side to which the plow point 3 is bolted. The last said side of the standard 2 being provided with a cutaway portion 4 for the reception of the said point. The lower or under side of the standard 2 is provided in its faces with the channels 5 which receive the lower ends of the handles 6 which are held in the said channels by the bolts 7. The cross bolt 8 connects the handles 6 together at a point above the beam 1 and the roller 9 is journaled upon the bolt 8 and bears upon the top of the beam 1. The upper longer side of the standard 2 is provided with a slightly inclined perforation 10 and the beam 1 is provided with a similar perforation which registers therewith. The set screws 11 pass transversely through the upper side of the standard 1 and enter the perforation 10. The colter 12 is of peculiar configuration. It is provided with an elongated shank 13 which lies in the perforation 10 and is held therein by the set screws 11. At the lower end of the shank 13 the said colter is extended or increased in lateral area and formed into a relatively broad blade 14. The forward edge of said blade is sharpened and rounded off at its lower end. The lower rear edge of the blade is upwardly inclined and is provided with the sharpened teeth or serrations 15.

As the implement is drawn through the soil the colter 12 which is located in advance of the plow point 3 cleaves the ground and the following point opens up the cleft thus made. By reason of the fact that the longitudinal axes and cutting edge 14 of the blade 12 is slightly rearwardly inclined the said colter will sever small roots with a shearing cut and will ride over the large ones and lift the plow over such obstructions without permitting the implement to catch or hang. The medium size roots or tough roots of small diameter are severed by the sharpened teeth 15 which operate upon them in the manner of a saw.

Having described my invention what I claim as new and desire to secure by Letters Patent is:—

In a plow such as described comprising a beam, a standard and handles, a colter having an elongated shank with a relatively broad blade having a cutting edge which is rounded off at its lower end and a lower edge provided with teeth or serrations.

In testimony that I claim the foregoing as my own, I have hereto affixed my signature in the presence of two witnesses.

JAMES H. TRIPP.

Witnesses:
L. E. LANCASTER,
L. N. LANCASTER.